Figure 1:
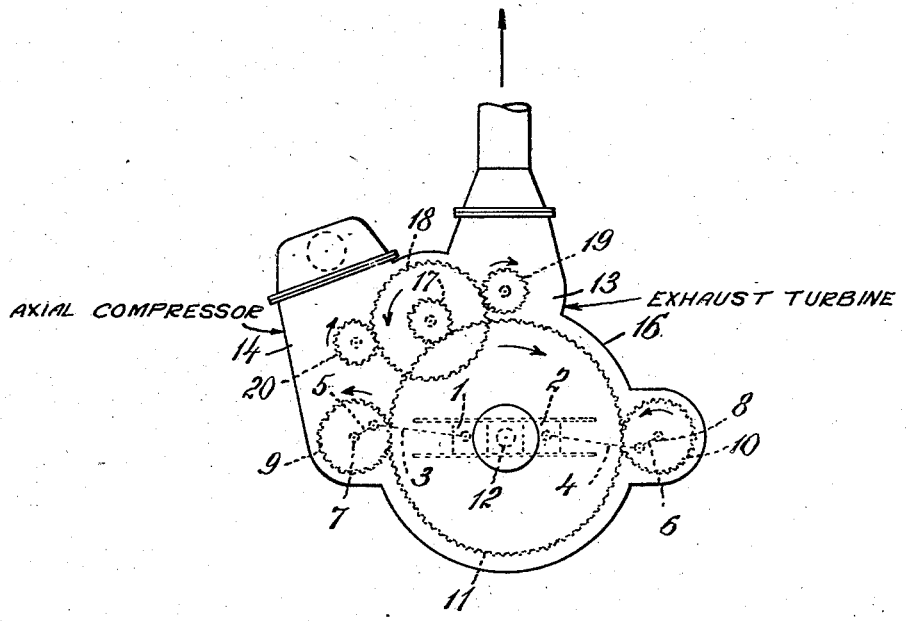

April 3, 1945.  W. KILCHENMANN  2,372,676
OPPOSED-PISTON ENGINE
Filed July 7, 1942  2 Sheets-Sheet 1

INVENTOR
Walter Kilchenmann
BY
ATTORNEYS

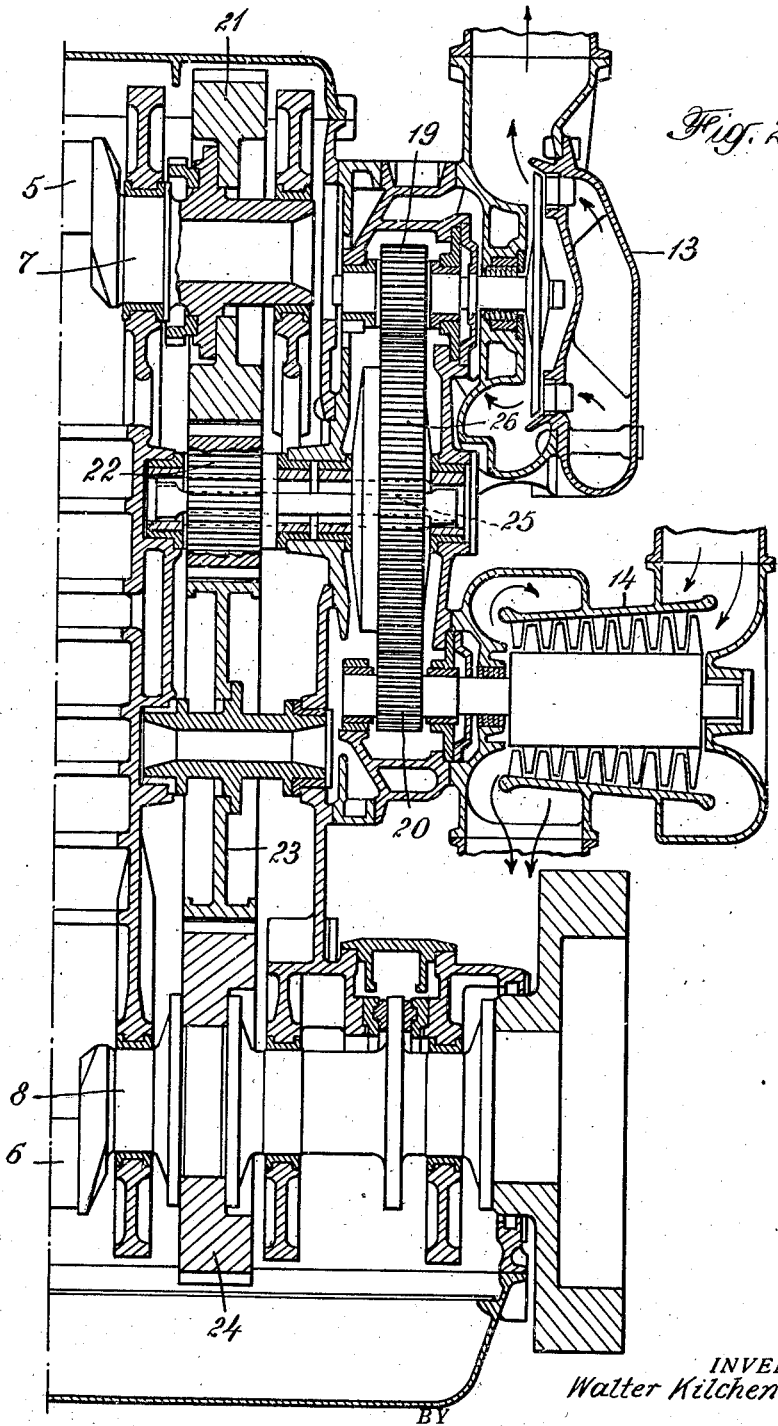

Patented Apr. 3, 1945

2,372,676

UNITED STATES PATENT OFFICE 2,372,676

OPPOSED-PISTON ENGINE

Walter Kilchenmann, Winterthur, Switzerland, assignor to Sulzer Frères, Société Anonyme, Winterthur, Switzerland Application July 7, 1942, Serial No. 449,994
In Switzerland November 20, 1941

3 Claims. (Cl. 60—13)

The invention relates to a two-shaft opposed-piston internal combustion engine with exhaust gas turbine and turbo compressor, which are all coupled, by a reduction gear bridging over the difference in speeds, to the central gear connecting the crankshafts. The invention consists in each rotary machine being connected through a separate toothed wheel to the reduction gear in such a way that each of these machines runs at the speed which is most favourable for it. Preferably the speed-reduction gear is connected to an intermediate wheel of the central gear arranged between the crankshafts, this intermediate wheel having a smaller diameter than the other toothed wheels of the central gear.

Two examples of execution according to the invention are shown in a simplified manner in Figs. 1 and 2 of the drawings.

The pistons 1 and 2 of the engine according to Fig. 1 drive, through connecting rods 3 and 4 and cranks 5 and 6, the shafts 7 and 8. The output of these shafts is transmitted by means of the pinions 9 and 10 and the toothed wheel 11 of a central gear to the main shaft 12. An exhaust turbine 13 and an axial compressor 14 are coupled, by a reduction gear bridging over the difference in speeds, to the central gear connecting the crankshafts 7 and 8.

In mesh with the toothed wheel 11 of the central gear is a pinion 17 of the gear bridging over the difference in speeds, which pinion is fitted on the same shaft as a toothed wheel 18. With the wheel 18 mesh on the one hand the toothed wheel 19 of the turbine 13 and on the other hand the toothed wheel 20 of the compressor 14. The wheels 19 and 20 are of such dimensions that both the turbine and the compressor 14 can run at their most favourable speeds.

The output of the turbine 13 is first of all transmitted through toothed wheel 19 to toothed wheel 18, whilst the compressor 14 is driven through the toothed wheel 20 from the same toothed wheel 18. If the power given up at the turbine is greater than the power required at the compressors, the excess power is transmitted to the main shaft 12 through the toothed wheels 17 and 11. If on the other hand the output of the turbine 13 is not alone sufficient to drive the compressor 14, the power still required is received from the main shaft 12 through the toothed wheels 11, 17 and 18.

The crankshafts 7 and 8 of the engine according to Fig. 2 are connected to each other through the toothed wheels 21, 22, 23 and 24 of the central gear. Among these toothed wheels the smallest one 22 is connected to a toothed wheel 26 through a shaft 25 which is designed as a torsion spring shaft. This toothed wheel 26 is in mesh on the one hand with the toothed wheel 19 of the exhaust gas turbine 13 and on the other hand with the toothed wheel 20 of the compressor 14. The toothed wheels 19 and 20 are of such diameters that the turbine and the compressor can run at their most favourable speeds.

Instead of a rotary compressor, a centrifugal compressor can equally well be adopted.

I claim:

1. The combination with a two-shaft internal combustion engine which comprises a gear connected to and driven by each crankshaft, a third gear connected to and driven by each of the aforementioned gears, a fourth gear connected to the third gear, a fifth gear on the same shaft with the fourth gear, an exhaust gas turbine connected by a sixth gear to the fifth gear, and a compressor connected by a seventh gear to the fifth gear, said sixth and seventh gears being so proportioned with respect to the fifth gear that the exhaust gas turbine and the compressor each run at the most favorable speeds.

2. The combination according to claim 1 characterized by a main shaft connected to and driven by the third gear.

3. The combination according to claim 1 characterized by a third gear which is considerably larger in diameter than the gears connected to each crankshaft, the fifth gear being larger in diameter than the fourth gear and arranged to drive the fourth gear, the sixth and seventh gears each being smaller in diameter than the fifth gear whereby the turbine and the compressor each run at greater speeds than the fifth gear.

WALTER KILCHENMANN.